US011728708B2

(12) United States Patent
Gerard et al.

(10) Patent No.: US 11,728,708 B2
(45) Date of Patent: Aug. 15, 2023

(54) COMPACT HALBACH ELECTRICAL GENERATOR FOR INTEGRATION IN A SOLID BODY

(71) Applicants: LUXEMBOURG INSTITUTE OF SCIENCE AND TECHNOLOGY (LIST), Esch-sur-Alzette (LU); LUXEMBOURG PATENT COMPANY S.A., Lintgen (LU)

(72) Inventors: Mathieu Gerard, Rehon (FR); Jérôme Polesel Maris, Mexy (FR)

(73) Assignees: LUXEMBOURG INSTITUTE OF SCIENCE AND TECHNOLOGY (LIST), Lintgen (LU); ROTAREX S.A., Lintgen (LU)

( * ) Notice: Subject to any disclaimer, the term of this patent is extended or adjusted under 35 U.S.C. 154(b) by 420 days.

(21) Appl. No.: 16/771,253

(22) PCT Filed: Dec. 12, 2018

(86) PCT No.: PCT/EP2018/084601
§ 371 (c)(1),
(2) Date: Jun. 10, 2020

(87) PCT Pub. No.: WO2019/115632
PCT Pub. Date: Jun. 20, 2019

(65) Prior Publication Data
US 2021/0175778 A1 Jun. 10, 2021

(30) Foreign Application Priority Data

Dec. 13, 2017 (LU) .................................. LU100556

(51) Int. Cl.
*H02K 7/18* (2006.01)
*H02K 1/14* (2006.01)
(Continued)

(52) U.S. Cl.
CPC ........... *H02K 7/1823* (2013.01); *H02K 1/145* (2013.01); *H02K 1/27* (2013.01); *H02K 5/163* (2013.01); *H02K 7/1846* (2013.01)

(58) Field of Classification Search
CPC ........... H02K 1/27; H02K 5/16; H02K 5/163; H02K 7/1823; H02K 7/1846
(Continued)

(56) References Cited

U.S. PATENT DOCUMENTS

| 11,271,455 B2 * | 3/2022 | Teofili | H02K 9/06 |
| 2021/0234415 A1 * | 7/2021 | Taniguchi | H02K 1/187 |

(Continued)

FOREIGN PATENT DOCUMENTS

| DE | 3025675 A1 | 1/1981 |
| DE | 19505698 A1 | 8/1996 |

(Continued)

OTHER PUBLICATIONS

International Search Report for PCT/EP2018/084601 dated Feb. 13, 2019.
(Continued)

*Primary Examiner* — Rashad H Johnson
(74) *Attorney, Agent, or Firm* — Sandberg Phoenix & von Gontard PC (57) ABSTRACT

An electric generator comprising a rotor with permanent magnets, configured for rotating about a rotation axis; at least one magnetic yoke with at least two arms extending axially inside or outside of the rotor so as to be adjacent to the radial inner or outer side, respectively, of the rotor; wherein the permanent magnets are arranged according to an Halbach array so as to maximize the magnetic field on the radial side of the rotor adjacent to the arms of the at least one yoke. Also, a valve for gas cylinder, equipped with a corresponding electric generator.

17 Claims, 7 Drawing Sheets

(51) Int. Cl.
*H02K 1/27* (2022.01)
*H02K 5/16* (2006.01)

(58) Field of Classification Search
USPC .......................................................... 290/52
See application file for complete search history.

(56) References Cited

U.S. PATENT DOCUMENTS

2022/0006339 A1* 1/2022 Takahashi ............ H02K 13/006
2022/0115937 A1* 4/2022 Polesel .................... H02K 1/27

FOREIGN PATENT DOCUMENTS

| DE | 19954964 | A1 | 5/2001 |
|----|----------|----|--------|
| DE | 202005019163 | U1 | 6/2006 |
| DE | 102006010168 | A1 | 9/2006 |
| EP | 0425260 | A1 | 5/1991 |
| EP | 2039938 | A2 | 3/2009 |
| GB | 2505454 | A | 3/2014 |
| JP | H02197243 | A | 8/1990 |
| WO | 2008022766 | A1 | 2/2008 |

OTHER PUBLICATIONS

Written Opinion for PCT/EP2018/084601 dated Feb. 13, 2019.
Alshibani Salem et al., "Optimization of a MW Halbach PMSG for wind turbine applications", 2016 XXII International Conference on Electrical Machines (ICEM), IEEE, Sep. 4, 2016 (Sep. 4, 2016), p. 1963-1969.

* cited by examiner

COMPACT HALBACH ELECTRICAL GENERATOR FOR INTEGRATION IN A SOLID BODY

CROSS-REFERENCE TO RELATED APPLICATIONS

The present invention is the US national stage under 35 U.S.C. § 371 of International Application No. PCT/EP2018/084601, which was filed on Dec. 12, 2018, and which claims the priority of application LU 100556 filed on Dec. 13 2017, the content of which (text, drawings and claims) are incorporated here by reference in its entirety.

FIELD

The invention is directed to the field of electrical generators and also the field of valves and conduits for controlling a flow of gas on a gas cylinder or a flow of liquid in a hydraulic turbine.

BACKGROUND

Prior art patent document published DE 199 54 964 A1 discloses a hydraulic turbine generator. The generator is of a compact construction suitable to be mounted on a conduit for converting a flow of fluid in the conduit into electrical power. The generator comprises a turbine wheel and a rotor mounted on a shaft. The rotor is surrounded by a cylindrical wall delimiting a cavity for the rotor and the fluid. The rotor comprises permanent magnets and a stator is arranged around the wall. The stator comprises a first element made of ferromagnetic material with a base portion and a series of arms extending axially from the base portion along the outer surface of the wall, a second similar element with also a base portion and series of arms offset relative to those of the first element, and a coil arranged between the base portions of the first and second elements. That construction is interesting in that a proper fluid tightness is achieved because the fluid driving the turbine wheel is not in contact with the stator, meaning that no rotary sealing is necessary around the shaft, between the turbine wheel and the rotor. The wall is cap-shaped and held in a fluid tight contact with the body of the generator by means of a ticker sleeve surrounding the arms of the stator. For applications with high pressure this can be critical and lead to leakages.

Prior art patent document published JPH 02197243 A discloses also a compact generator of a similar construction to the preceding document. The rotor shows permanent magnets which are however oriented S-N-S- . . . along the rotor periphery. Also, there is no wall separating the rotor and the stator because there is no working fluid, except air, circulating and in contact with the rotor.

Prior art patent document published EP 0 425 260 A1 discloses also a compact generator of a similar construction to the two preceding documents. It concerns a built-in generator arranged within a hub of a cycle wheel, including a hub member rotatably fitted on an axle which is to be fixed to a frame of the cycle, a stationary hollow cylinder (the stator composed of two four strip-shaped poles armatures) fixed to the axle in the hub member, a generating coil unit (held between the two four strip-shaped poles armatures of the stator) provided in the stationary hollow cylinder and fixed thereto, and a rotor formed integrally with a magnet rotatably provided on the axle.

Prior art patent document published DE 195 05 698 A1 discloses a hydraulic turbine generator similar to the one of the above cited document DE 199 54 964 A1. In that generator, the fluid flows axially relative to the rotation axis of the rotor. The fluid, for instance water, fills the cavity where the rotor is located, similarly to the above cited document.

Prior art patent document published DE 20 2005 019 163 U1 discloses a hydraulic turbine generator similar to those of the above cited documents. The turbine wheel is however mounted directly on the magnetic rotor. Also the rotor is particularly built in that it comprises an inner ring with permanent magnets and an outer ring surrounding the inner ring and being non-magnetic so as to promote the magnetic field towards the interior of the rotor. Also, the stator and the coil(s) are located inside the rotor. A wall separates a cavity housing the turbine wheel, the rotor and the fluid from the stator inside the rotor.

The above discussed turbine generators are intended to be compact. Each of them forms however a specific unit that can be mounted on a conduit (DE 199 54 964 A1), or connected to conduits (DE 195 05 698 A1 and DE 20 2005 019 163 U1). In other words, these generator are not suitable for being integrated in a device, e.g. a device forming a conduit or passage for the fluid. In addition, these generators, also supposed to be compact, remain bulky for such an integration. The specific electrical output power, i.e. power per unit volume of the generator remains low and subject to improvement. Also, the above generators are not conceived for fluids under high pressure.

SUMMARY

The invention has for technical problem to provide an electric generator that overcomes at least one of the drawbacks of the above cited prior art. More specifically, the invention has for technical problem to provide an electric generator that can be particularly compact while providing a satisfactory output power, in particular for being integrated into an existing device.

The invention is directed to an electric generator comprising: a rotor with permanent magnets, configured for rotating about a rotation axis; a magnetic yoke with at least two arms extending axially inside or outside of the rotor so as to be adjacent to the radial inner or outer side, respectively, of the rotor; wherein the permanent magnets are arranged according to an Halbach array so as to maximize the magnetic field on the radial side of the rotor adjacent to the arms of the yoke.

According to an exemplary embodiment, the permanent magnets are arranged so as to successively rotate by 90° along the circumference of the rotor.

According to an exemplary embodiment, the generator comprises at least one coil arranged at a distal portion of the at least one yoke where the arms of the yoke join each other, so as to be in a variable magnetic field produced by a rotation of the rotor relative to the at least one yoke.

According to an exemplary embodiment, each of the at least one yoke further comprises at least one bridge interconnecting diametrically opposed arms of the yoke.

According to an exemplary embodiment, the at least one yoke comprises a first yoke and a second yoke, wherein the arms of the first yoke are angularly offset relative to the arms of the second yoke.

According to an exemplary embodiment, the at least one coil is sandwiched between the bridges of the first and second yokes.

According to an exemplary embodiment, the generator comprises a wall forming a cavity housing the rotor, the arms of the at least one yoke being out of the cavity.

According to an exemplary embodiment, the wall forming the cavity is made of solid material, the arms of the at least one yoke extending inside the material.

According to an exemplary embodiment, the material of the wall is non-ferromagnetic, such as aluminium, austenitic stainless steel, ceramic or brass with permeability equal or very close to 1.

According to an exemplary embodiment, the generator further comprises a turbine wheel mechanically coupled to the rotor.

According to an exemplary embodiment, the generator further comprises a shaft supporting the rotor and the turbine wheel, and bearings at each end of the shaft.

According to an exemplary embodiment, the turbine wheel is located axially on the rotor and surrounds the rotor.

According to an exemplary embodiment, the turbine wheel is an axial turbine wheel comprising blades extending radially and configured for being converting an annular axial flow through the blades into a rotational movement of the turbine wheel and the rotor.

According to an exemplary embodiment, the cavity houses the turbine wheel.

According to an exemplary embodiment, at least one, in various instances each, of the arms of the at least one magnetic yoke comprises at least one, in various instances several slits extending lengthwise.

Advantageously, the arms of the at least one magnetic yoke have the same width.

The invention is also directed to a valve for gas cylinder, comprising: a body with an inlet, an outlet and a passage interconnecting the inlet and outlet; a flow control device mounted on the body and controlling the flow of gas in the passage; wherein the valve further comprises: an electric generator with a turbine wheel located in the passage, configured for outputting electric power when the gas flow in the passage rotates the turbine wheel.

According to an exemplary embodiment, the electric generator is according to the invention.

According to an exemplary embodiment, the generator comprises a wall forming a cavity housing the rotor and in various instances the turbine wheel, the arms of the yoke being out of the cavity, the wall being formed by the material of the body.

The invention is also directed to a conduit with a wall delimiting a passage for a fluid and with an electric generator with a turbine wheel located in the passage so as to be driven when the fluid flows, wherein the generator is according to the invention.

The invention is also directed to a use of an electric generator with a turbine wheel in a conduit for producing electricity while the fluid flows in the conduit, wherein the generator is according to the invention.

The invention is particularly interesting in that it provides a compact electric generator with an optimised specific output power. The use of a Halbach array in combination with axial arms of statoric magnetic yokes is particularly interesting in that the Halbach array produces a higher magnetic field that can then magnetise in a satisfactory manner the yoke(s) despite the presence of a possible wall there between. In particular, the wall can be made of solid material of the body of the generator, potentially forming a barrier for the development of a magnetic field beyond that wall. In addition, the use of a Halbach array maximises the magnetic field on one radial side of the rotor, the magnetic field on the opposite radial side being very low and thereby cause little electromagnetic disturbances. The magnetic field on the "strong" side of the rotor is absorbed by the yoke and the coil, so that it also cause little electromagnetic disturbances.

The electric generator of the invention is also particularly interesting for integration in a valve or any other kind of device that controls the flow of gas under high pressure, e.g. higher than 20 MPa or even 50 MPa. For such applications, the wall delimiting the cavity of the fluid needs to be massive and is usually made of non-ferromagnetic material such as brass, aluminium or austenitic stainless steel. The construction of the generator according to the invention is particularly adapted for such configuration for the arms of the yokes can be inserted into holes formed, e.g. by drilling or any kind of machining, in the solid material of the body, adjacent to the wall delimiting the cavity.

DETAILED DESCRIPTION

Figure 1:
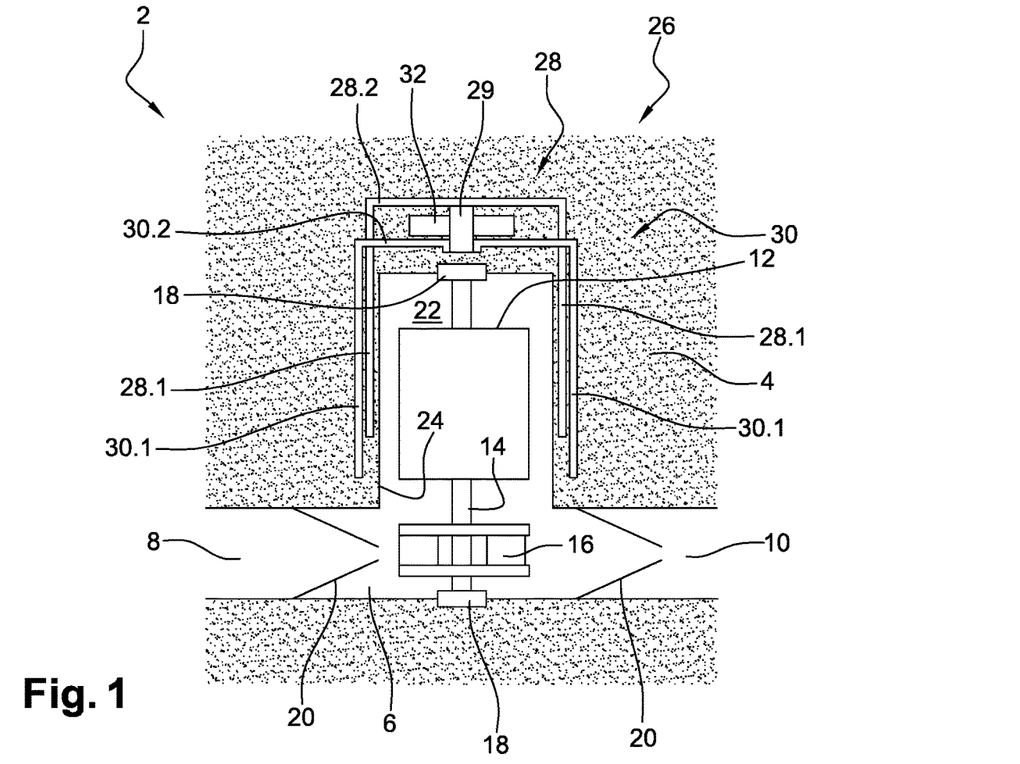
FIG. 1 is a schematic sectional view of an electric generator according to an exemplary first embodiment of the invention.

FIG. 1 is a schematic cross-section of an electric generator according to an exemplary first embodiment of the invention.

The electric generator 2 illustrated in FIG. 1 is for instance a turbine electric generator, being understood that another power source than a flow of a fluid could drive the generator. The generator 2 comprises a body 4 that forms a passage 6 for a fluid, with an inlet 8 and an outlet 10. The generator 2 comprises also a rotor 12 supported by a shaft 14, and a turbine wheel 16 located in the passage 10 and mechanically coupled with the rotor 12. For instance, the turbine wheel 16 supported by the shaft 14 and is therefore directly coupled to the rotor 12. The shaft 14 supported by bearings 18 at both ends of the shaft, the bearings being attached to the body 4 of the generator 2. Flow guiding surfaces 20 can be provided in the passage 10 for optimizing the cooperation of the flow with the turbine wheel 16.

The rotor 12 comprises an array of permanent magnets (not represented) that produce a permanent magnetic field at the periphery of the rotor, for instance in the cavity 22 housing the rotor and also outside the wall 24 delimiting the cavity, i.e. in the material of the body 4. The permanent magnets are advantageously arranged according to a Halbach array that maximizes the magnetic field on one radial side of the rotor, for instance on the outer side. The Halbach array will be detailed below in connection with FIGS. 5 to 7.

The generator 2 further comprises a stator 26 that is for instance composed essentially of two yokes 28 and 30 made of ferromagnetic material and comprising, each, at least a pair of, advantageously four, arms 28.1 and 30.1 extending axially along the wall 24 delimiting the cavity 22 and a bridge 28.2 and 30.2 interconnecting the arms, respectively. In FIG. 1, the yokes are represented as if their respective arms 28.1 and 30.1 were angularly aligned whereas in reality the yokes are angularly offset as is apparent in FIG. 3. The stator 26 comprises also a coil 32, or at least one coil, that is located between the bridges 28.2 and 30.2 of the yokes 28 and 30. More specifically, the stator 26 can also comprise a magnetic coupler 29 that magnetically couples the yokes 28 and 30 by interconnecting the bridges 28.2 and 30.2. The coupler 29 advantageously traverses the coil 32.

The functioning of the generator is the following. When the fluid flows through the passage 6, from the inlet 8 towards the outlet 10, the flow drives the turbine wheel 16 in rotation and thereby rotates the rotor 12. The later produces a magnetic field with orientations that alternate along the periphery of the rotor. This magnetic field is fixed relative to the rotor 12. The rotation of the rotor 12 causes a variation of the magnetic field produced in the arms 28.1 and 30.1 of the yokes 28 and 30. This variably magnetic field propagates along the arms to the bridges 28.2 and 30.2 and to the coupler 29, and induces in the coil 32 an electromotive force that produces an electrical power output.

Figure 2:
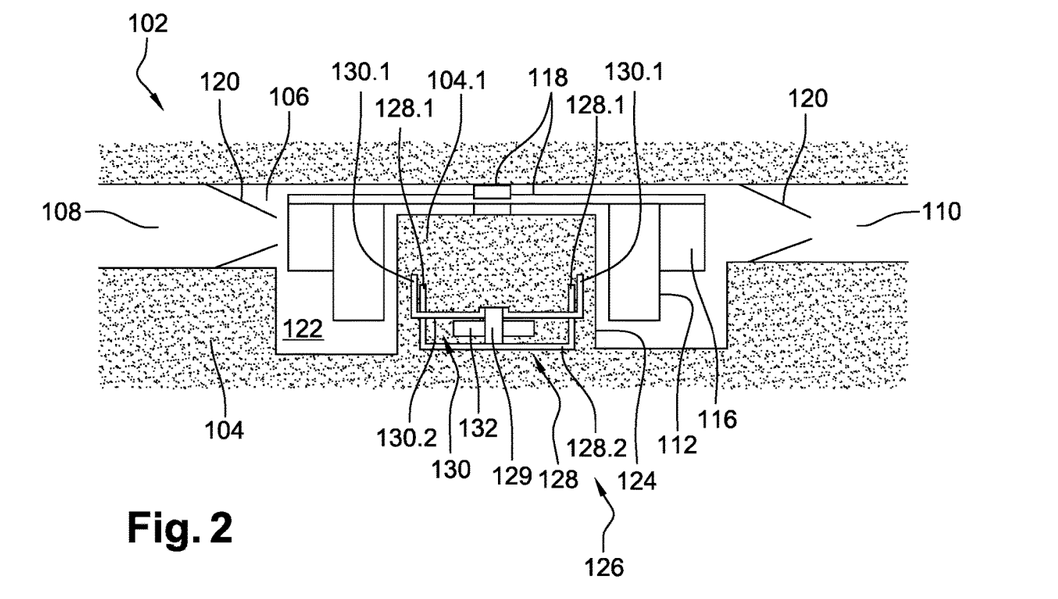
FIG. 2 is a schematic sectional view of an electric generator according to an exemplary second embodiment of the invention.

FIG. 2 is a schematic cross-section of an electric generator according to a second exemplary embodiment of the invention. The reference numbers of the first exemplary embodiment are used here for designating the same or corresponding elements, these numbers are however incremented by 100. Reference is made to the description of these elements in relation with the first exemplary embodiment.

The electric generator 102 of FIG. 2 is similar to the one of FIG. 1. It differs however essentially with regard to the following two aspects.

The first one is that the stator 126 is located inside the rotor 112. The rotor 112 is hollow and forms an open cavity that surrounds a cylindrical portion 104.1 of the body 104. That portion 104.1 forms a wall 124 delimiting a cavity 122 for the rotor 112 and the fluid. The stator 126 comprises arms 128.1 and 130.1 of yokes 128 and 130 that extend inside the volume delimited by the wall 124, for instance inside the material of the portion 104.1 of the body 104. The rotor 112 comprises an array of permanent magnets that is arranged so that the magnetic field produced by the magnets is present on the inner side of the rotor 112. The permanent magnets are advantageously arranged according to a Halbach array that maximizes the magnetic field on one radial side of the rotor, for instance on the inner side. The Halbach array will be detailed below in connection with s FIGS. 5 to 7.

The other aspect that differentiates the second exemplary embodiment is that the turbine wheel 116 is mounted directly on the rotor 112. For instance, the turbine wheel 116 is located around the rotor 112. A shaft as such might not necessary anymore. For instance, the combined rotor 112 and turbine wheel 116 comprise a radial wall or bridge that interconnects both rotor and turbine to the bearings 118 attached to the body 104.

The functioning of the generator is similar to the functioning of the generator of the first exemplary embodiment. When the fluid flows through the passage 106 from the inlet 108 to the outlet 110, the fluid drive in rotation the turbine wheel 116 and therefore also the rotor 112. The later produces a magnetic field on its inner side and therefore in the arms 128.1 and 130.1 of the yokes 128 and 130. The rotation of the rotor 112 causes the magnetic field produced in the arms to vary and thereby to produce an electromotive force in the coil 132.

The construction of the generator according to the second exemplary embodiment is advantageous in that that generator is particularly compact in height.

In both embodiments, the rotor advantageously is in contact with the fluid driving the turbine wheel, meaning that no rotary sealing is necessary around the shaft. The material of the body is advantageously non ferromagnetic, i.e. shows a relative magnetic permeability that is lower than 10, in various instances lower than 5, for example lower than 2, like for example stainless steel, more particularly austenitic stainless steel, aluminium, brass or copper, ceramic or thermosetting plastic or thermoplastic. The material of the yoke shows a high relative permeability, e.g. greater than 100, in various instances greater than 1000, like mu-metal, permalloy, invar, iron, ferritic stainless steel or ferrite. The fact that the material of the body around the arms of the yoke, more particularly between the arms of the yokes and the rotor, is non-ferromagnetic promotes the concentration in the arms of the magnetic field produced by the rotor.

In addition, still for both embodiments, the use of the solid material of the body for forming the wall delimiting the cavity housing the rotor is interesting for applications with gas under high pressure, e.g. greater than 20 MPa, in various instances greater than 50 MPa. Indeed, in the presence of such pressures the gas, the wall delimiting the cavity housing the fluid need to be particularly rigid and stable to avoid deformation and leakage. The arms of the yokes can be inserted in holes drilled in the body, at the proximity of the wall.

Figure 3:
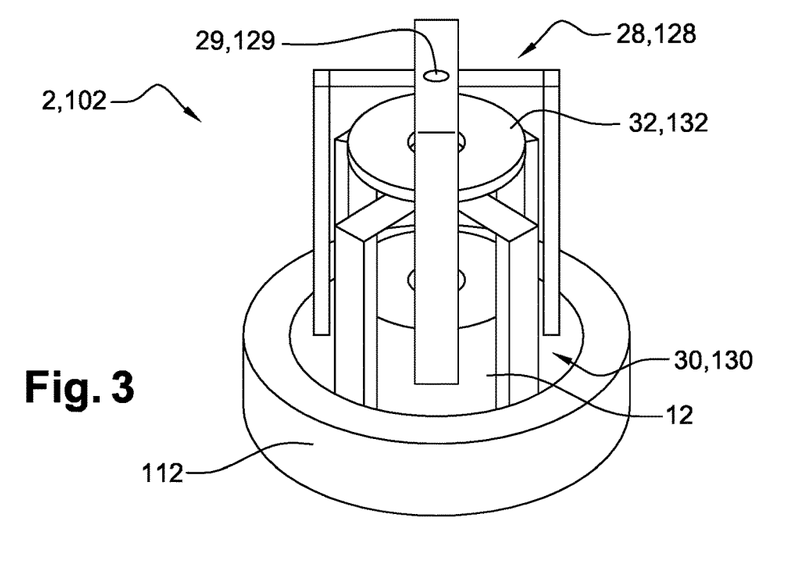
FIG. 3 illustrates in a schematic way the stator and rotors of both exemplary embodiments of the invention.

FIG. 3 illustrates in a schematic way the stator and rotors of both first and second exemplary embodiments of the invention. We can observe that the stator 26/126 comprises for instance two yokes 28/128 and 30/130, each yoke comprising four arms that are angularly offset relative to the arms of the other yoke. The coil 32/132 is located between the bridges of the yokes 28/128 and 30/130. According to the first exemplary embodiment (FIG. 1), the rotor 12 is located inside the volume delimited by the arms of the yoke. According to the second exemplary embodiment (FIG. 2), the rotor 112 is located around the arms of the yokes. In the first exemplary embodiment, the rotor 12 exhibits a magnetic field predominantly on its outer side so as to magnetize the stator disposed around the rotor, whereas in the second exemplary embodiment, the rotor 112 exhibits a magnetic field predominantly on its inner side so as to magnetize the stator disposed inside the rotor.

Figure 4:
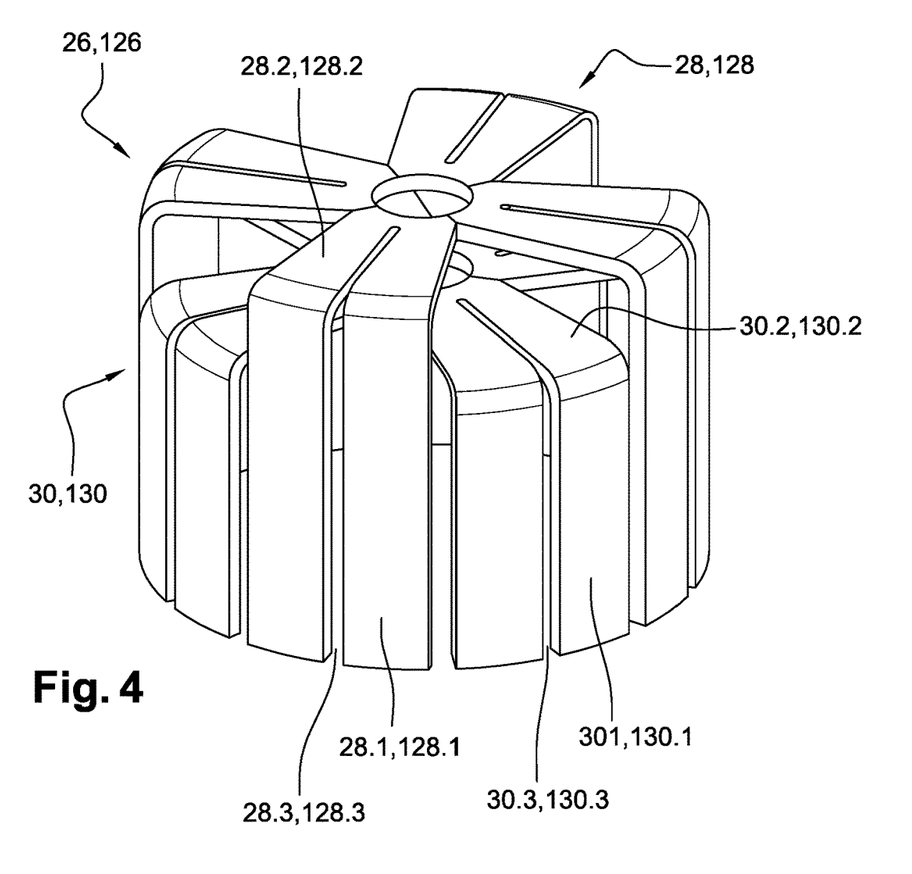
FIG. 4 illustrates an alternative stator for both exemplary embodiments of the invention.

FIG. 4 illustrates an alternative arrangement of the stator 26/126 where the arms of the yokes 28/128 and 30/130 of the stator 26/126 shows each a parallel slit 28.3/128.3 and 30.3/130.3 extending lengthwise and in various instances also along the radial portion of the arms. Such slits extend radially through the whole thickness of the arms. They are useful for reducing the generation of eddy currents and the corresponding back electromotive forces in the arms. The slits advantageously extend at least in vis-à-vis of the rotor 12/112. This configuration allows to provide arms that extend along a larger sector, thereby increasing the magnetic inductance in the arms and the power output of the generator.

FIGS. 5 to 13 illustrate the effects of a Halbach array for the permanent magnets on the rotor of the electric generator of the present invention.

Figure 5:
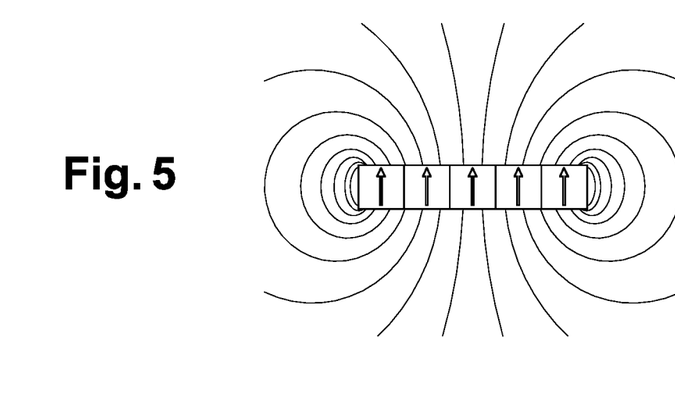
FIG. 5 exemplarily illustrates the magnetic field of a linear array of permanent magnets with a single magnetisation orientation, in accordance with various embodiments of the present invention.
Figure 6:
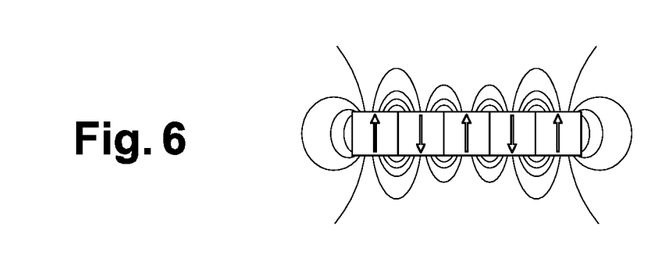
FIG. 6 exemplarily illustrates the magnetic field of a linear array of permanent magnets with an alternating array of magnetisation orientations, in accordance with various embodiments of the present invention.
Figure 7:
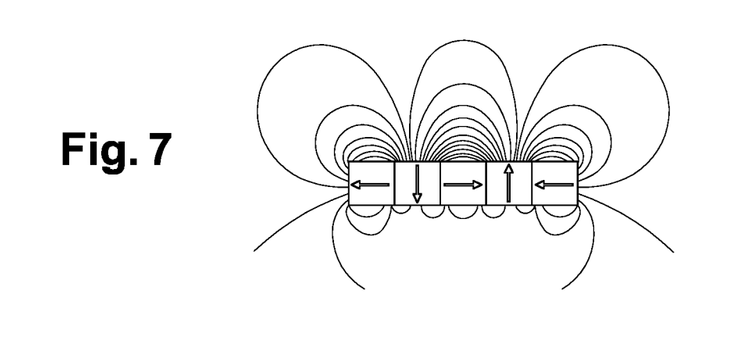
FIG. 7 exemplarily illustrates the magnetic field of a linear array of permanent magnets with a Halbach array of magnetisation orientations, in accordance with various embodiments of the present invention.

FIGS. 5 to 7 illustrate in a comparative manner the production of magnetic field with a single pole linear array of permanent magnets, a multipole linear array of permanent magnets with alternating polarity and a multipole linear array of permanent magnets with a Halbach array.

FIG. 5 illustrates the lines of the magnetic field produced by a permanent magnet with a single pole orientation, for instance a linear juxtaposition of permanent magnets where the magnetization directions of the magnets are parallel and show the same orientation perpendicular to the linear arrangement. As is apparent, the magnetic field is symmetric relative to a plane extending centrally through the magnet along the linear direction (horizontal in FIG. 5), essentially because the magnetic field lines form loops around the two opposites ends of the magnet.

FIG. 6 illustrates the lines of the magnetic field produced by a multipole permanent magnet where the poles are alternating. More specifically, the permanent magnet is formed by a linear juxtaposition of a series of permanent magnets where the magnetisation orientations alternate. We can observe that the intensity of the magnetic field is identical on both main sides of the magnet and that the field is periodically alternated compared with the permanent magnet of FIG. 5 with a single pole orientation.

FIG. 7 illustrates a permanent magnet of the same size and shape as those of FIGS. 5 and 6, showing however a Halbach array. A Halbach array is a special arrangement of permanent magnets that augments the magnetic field close to a factor of two on one side of the array (compared to the multipole permanent magnet of FIG. 6) while cancelling the field to near zero on the other side. This is achieved by having a spatially rotating pattern of magnetisation. The rotating pattern of permanent magnets (on the front face; on the left, up, right, down) can be continued indefinitely and have the same effect. Such an arrangement is as such known to the skilled person and therefore does not need to be developed further. In FIG. 7, we can observe that the magnetisation directions of the permanent magnets that are juxtaposed along the main direction successively change by a rotation of 90°. We can also observe that the magnetic field is more developed on one side, for instance the upper side, than on the other side, for instance the lower side.

Figure 8:
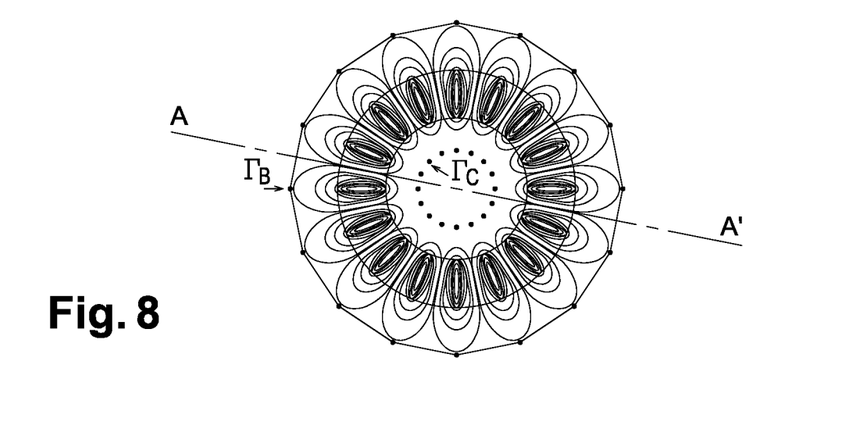
FIG. 8 exemplarily illustrates the magnetic field distribution in a ring-shaped rotor with a classic array of 16 permanent magnets, in accordance with various embodiments of the present invention.
Figure 9:
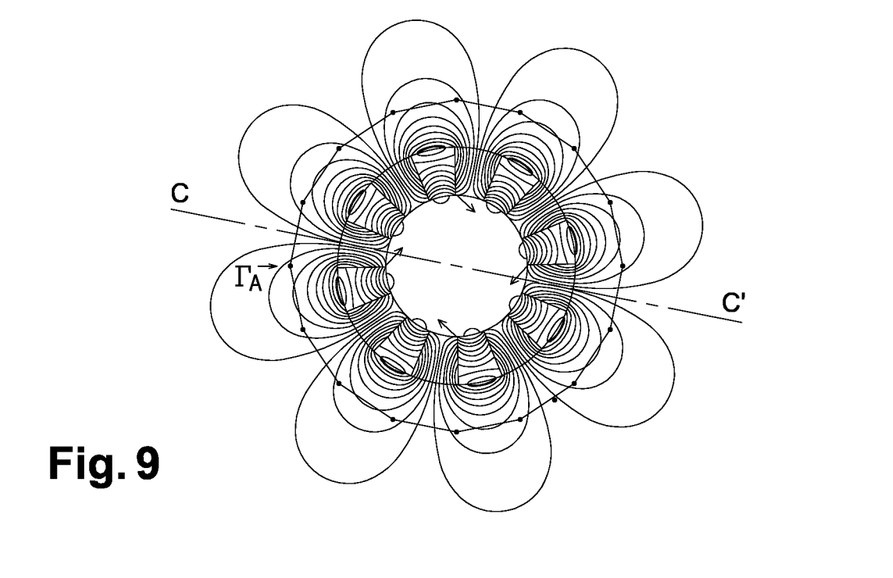
FIG. 9 exemplarily illustrates the magnetic field distribution in a ring-shaped rotor with a Halbach array of 16 permanent magnets where the magnetic field maximized on the outer side, in accordance with various embodiments of the present invention.
Figure 10:
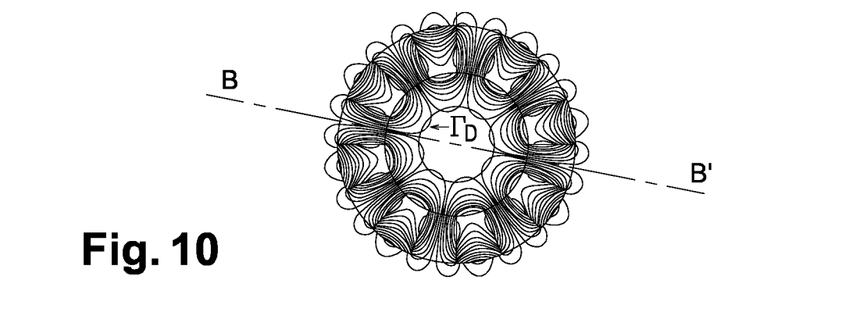
FIG. 10 exemplarily illustrates the magnetic field distribution in a ring-shaped rotor with a Halbach array of 16 permanent magnets where the magnetic field maximized on the inner side, in accordance with various embodiments of the present invention.

FIGS. 8 to 10 illustrate the magnetic field lines on a ring-shaped rotor with a classic array of 16 permanent magnets where the magnetisation directions alternate, a corresponding ring-shaped rotor with a Halbach array of 16 permanent magnets where the magnetic field is maximized on the outer side, and a corresponding ring-shaped rotor with a Halbach array of 16 permanent magnets where the magnetic field is maximized on the inner side, respectively. In these figures, the dimensions of the rotor are the same, the permanent magnets are the same and the magnetisation of the poles is the same. We can observe that the magnetic field on the outer side of the rotor in FIG. 9 is more developed than on the rotor in FIG. 8. Similarly, we can observe that the magnetic field on the inner side of the rotor in FIG. 10 is more developed than on the rotor in FIG. 8.

Figure 11:
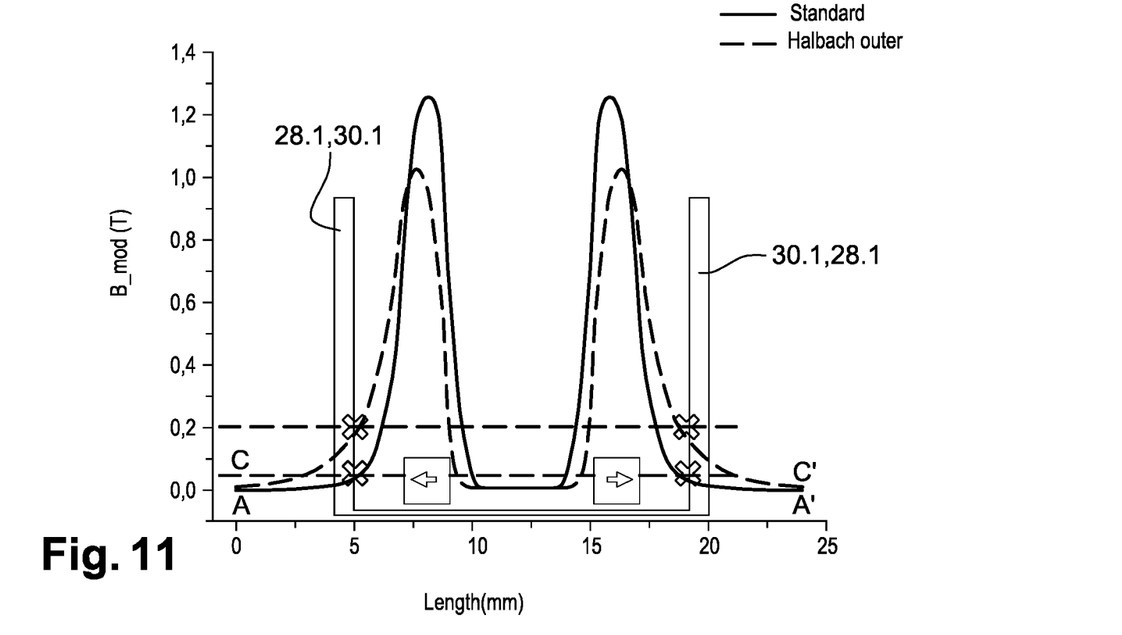
FIG. 11 exemplarily illustrates the modulus of the magnetic induction along diametrical cross-sections in the rotor of FIGS. 8 and 9, in accordance with various embodiments of the present invention.
Figure 12:
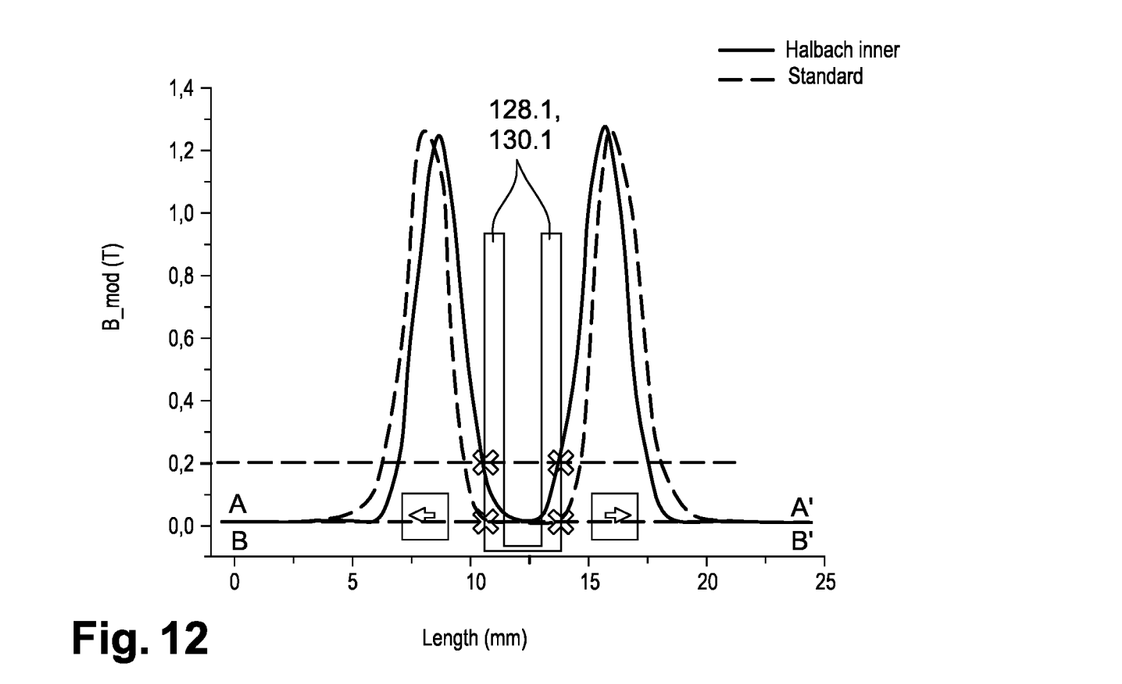
FIG. 12 exemplarily illustrates the modulus of the magnetic field along diametrical cross-sections in the rotor of FIGS. 8 and 10, in accordance with various embodiments of the present invention.

FIGS. 11 and 12 illustrate the distribution of the magnetic field modulus B mod of the rotor along the diametrical cross-sections A-A', B-B' and C-C' in FIGS. 8 to 10. The magnetic field modulus is expressed in Tesla on the ordinate axis and the position along the cross-section is expressed in mm on the abscissa axis. On FIG. 11, the positions of the arms 28.1 or 30.1 of the yokes of the first exemplary embodiment in FIG. 1 are illustrated. On FIG. 12, the positions of the arms 128.1 or 130.1 of the yokes of the second exemplary embodiment in FIG. 2 are illustrated. For both, the two arrows correspond to the magnetization directions of two permanent magnets of the outer surface of the rotor.

In FIG. 11, the crosses on both magnetic field modulus curves A-A' and C-C' correspond to the inner face of the arms of the yokes located outside of the rotor, i.e. to the magnetic field that is "seen" by the yokes of the stator. We can observe that the magnetic field produced in the yoke by the rotor of FIG. 9, i.e. with a Halbach array of poles maximizing the magnetic field on the outer side, is substantially higher than the one produced by the rotor of FIG. 8, i.e. with a standard alternating array of poles.

In FIG. 12, the crosses on both magnetic field modulus curves A-A' and B-B' correspond to the outer face of the arms of the yokes located inside the rotor, i.e. to the magnetic field that is "seen" by the yokes of the stator. Similarly to FIG. 11, we can observe that the magnetic field produced in the yoke by the rotor of FIG. 10, i.e. with a Halbach array of poles maximizing the magnetic field on the inner side, is substantially higher than the one produced by the rotor of FIG. 8, i.e. with a standard alternating array of poles.

Figure 13:
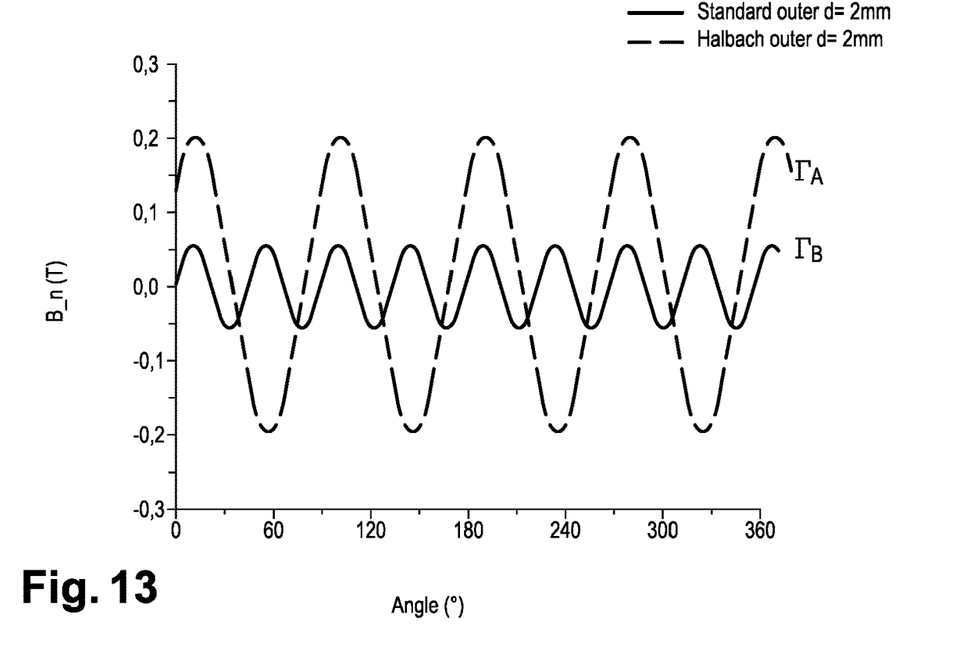
FIG. 13 exemplarily illustrates the normal component of the magnetic field along a circular contour around the rotors of FIGS. 8 and 9, in accordance with various embodiments of the present invention.
Figure 14:
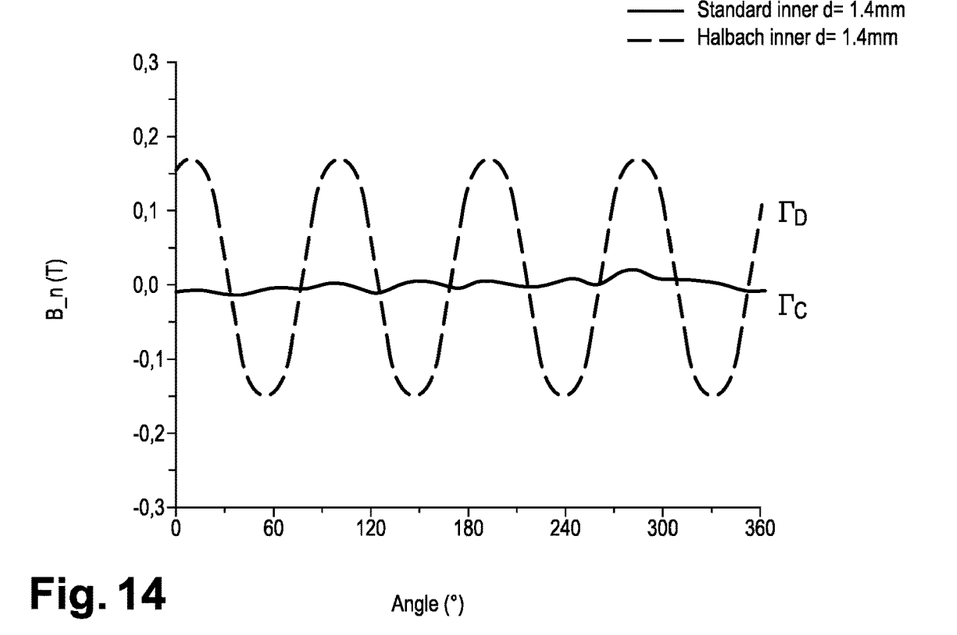
FIG. 14 exemplarily illustrates the normal component of the magnetic field along a circular contour around the rotors of FIGS. 8 and 10, in accordance with various embodiments of the present invention.

FIGS. 13 and 14 illustrate the normal component of the magnetic field along a circular contour Γ around or inside the rotors of FIGS. 8 to 10. The normal component of the magnetic field B_n is expressed in Tesla on the ordinate axis relative to an angular position expressed in degrees on the abscissa axis.

In FIG. 13, the curve $\Gamma_A$ corresponds to the normal component of the magnetic field along a circular contour around the rotor of FIG. 9 (Halbach array with outer magnetic field) whereas the curve $\Gamma_B$ corresponds to the normal component of the magnetic field along a contour of the same diameter around the rotor of FIG. 8 (standard alternating array). We can observe a substantial increase of the value of the magnetic field with the Halbach array.

In FIG. 14, the curve $\Gamma_D$ corresponds to the normal component of the magnetic field along a circular contour inside the rotor of FIG. 10 (Halbach array with inner magnetic field) whereas the curve $\Gamma_c$ corresponds to the normal component of the magnetic field along a contour of the same diameter inside the rotor of FIG. 8 (standard alternating array). We can also observe a substantial increase of the value of the magnetic field with the Halbach array.

Figure 15:
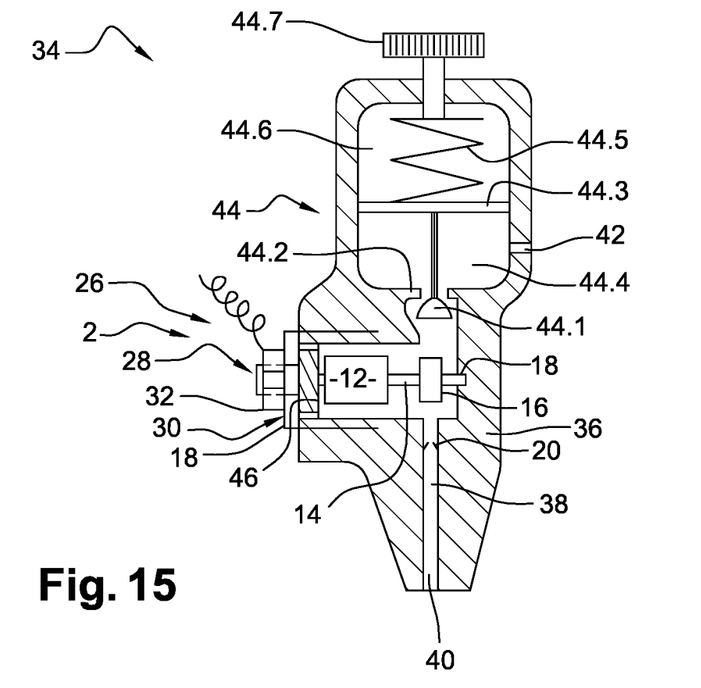
FIG. 15 illustrates an exemplary first embodiment of a valve for gas cylinder, comprising an electric generator according the first exemplary embodiment of the invention.
Figure 16:
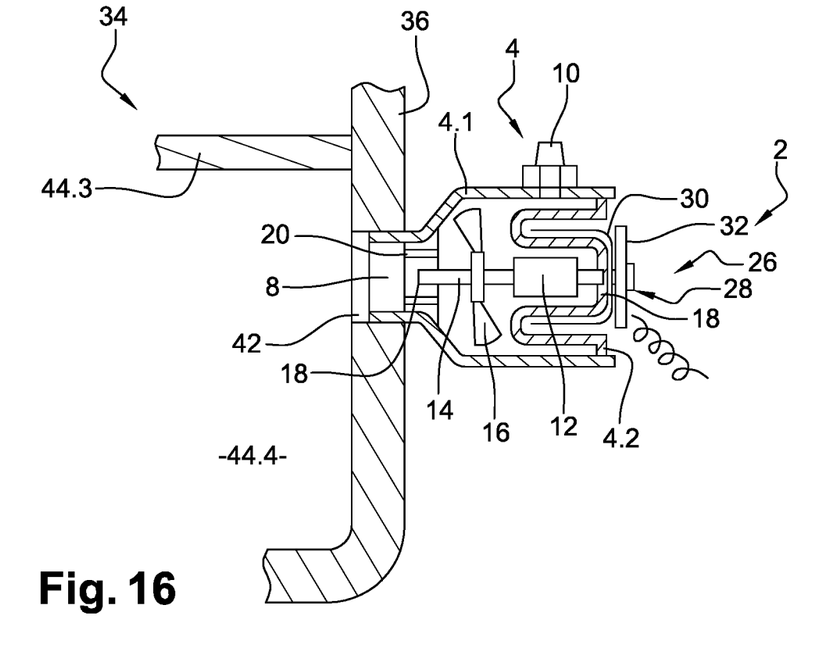
FIG. 16 illustrates an exemplary second embodiment of a valve for gas cylinder, comprising an electric generator according the first exemplary embodiment of the invention.

FIGS. 15 and 16 illustrate two embodiments of a valve to which an electric generator according to the present invention has been integrated. More specifically, FIG. 15 is a schematic sectional view of a valve for a gas cylinder, according to a first exemplary embodiment, incorporating an electric generator according to the first exemplary embodiment illustrated in FIG. 1. FIG. 16 is a partial schematic sectional view of a valve similar to the valve of FIG. 15, according to a second exemplary embodiment, incorporating an electric generator also according to the first exemplary embodiment illustrated in FIG. 1.

In FIG. 15, the valve 34 comprises a body 36 with a gas passage 38 interconnecting a gas inlet 40 with a gas outlet 42 on the body. The valve comprises a pressure reducer 44 that comprises a shutter 44.1 cooperating with a seat 44.2 where both are arranged in the gas passage 38 for shutting-off the passage. The pressure reducer 44 comprises also a piston 44.3 mechanically linked to the shutter 44.1 and slidable in a bore formed in the body 36. The piston 44.3 delimits with the bore in the body 36 a regulating chamber 44.4 that is downstream of the shutter 44.1 and its seat 44.2, and in a chamber 44.6 housing a spring 44.5 that elastically biases the piston 44.3 in a direction that acts on the shutter 44.1 so as to open the gas passage 38 in the seat 44.2. A device 44.7 for adjusting the pre-constraint of the spring 44.5 can be provided. The construction of the regulating valve described here above is as such well known to the skilled person.

As is apparent in FIG. 15, the electric generator 2 that is integrated in the valve 34 is located in the high pressure part of the gas passage 38, i.e. upstream of the shutter 44.1 and the seat 44.2. As is apparent, a cavity, such as a bore, has been formed in the body for receiving the rotor assembly of the generator, i.e. essentially the shaft 14 carrying the turbine wheel 16 and the rotor 12. A first bearing 18 is formed in the body for supporting the inner end of the shaft 14. The cavity in the body 36 is closed in a gas tight fashion by the plug 46 that forms a second bearing 18 for the outer end of the shaft 14. The yokes 28 and 30 of the stator 26 are inserted into holes or longitudinal cavities formed in the body 36 at the periphery of the cavity housing the rotor 12. The coil 32 of the stator 26 is then outside of the gas passage 38 of the valve and can be easily connected to any kind of electric or electronic device associated with the valve 34.

Still with reference to FIG. 15, the turbine wheel 16 is located in the gas passage 38 such as to be driven by the flow of gas in the passage when the regulator 44 is open. More specifically, flow guiding means 20 can be provided in the passage directly upstream of the turbine wheel 16 in order to accelerate the fluid properly with regard to the design of the turbine wheel 16 so as to maximize the transfer of energy to the wheel.

The integration of an electric generator according to the second exemplary embodiment in FIG. 2 is also possible, similarly to FIG. 15. In such a case, the gas passage in the body of the valve can show an annular cavity as illustrated in FIG. 2. Similarly to figure, the cavity formed in the body and the gas passage can be closed by a plug or any element that is securely fastened to the body.

In FIG. 16, only a portion of a valve similar to the valve of FIG. 15 is illustrated. The reference signs are the same as those of FIG. 15. The electric generator 2 is here in the low pressure part of the valve, i.e. downstream of the shutter and the seat of the pressure regulator. For instance, the generator is formed as a cartridge that is mounted on the gas outlet 40 of the valve 34. The body 4 is for instance formed essentially of a caving 4.1 and a plug 4.2. The latter is mounted in a gas tight fashion on the casing 4.1 and forms a cavity housing the rotor 12. It also forms an annular recess around the cavity, receiving the arms of the yokes 28 and 30 of the stator 26.

As is visible in FIG. 16, the turbine wheel 16 works axially, i.e. the flow the gas is generally parallel to the axis of the shaft 14, contrary to the embodiment of FIGS. 1 and 15. Also, the outlet 10 of the turbine is located at the periphery of the casing 4.1 being however understood that other configurations are possible.

The invention claimed is:

1. An electric generator, said generator comprising:
   a rotor with permanent magnets, configured for rotating about a rotation axis;
   at least one magnetic yoke with at least two arms extending axially inside or outside of the rotor so as to be adjacent to the radial inner or outer side, respectively, of the rotor;
   wherein the permanent magnets are arranged according to a Halbach array so as to maximize the magnetic field on the radial side of the rotor adjacent to the arms of the at least one yoke;
   wherein the generator comprises a wall forming a cavity housing the rotor, the arms of the at least one yoke being out of the cavity; and
   wherein the wall forming the cavity is made of solid material, the arms of the at least one yoke extending inside the solid material.

2. The electric generator according to claim 1, wherein the permanent magnets are arranged so as to show magnetic orientations which successively rotate by 90° along the circumference of the rotor.

3. The electric generator according to claim 1, wherein the generator comprises at least one coil arranged distant of the arms of the at least one yoke, so as to be in a variable magnetic field produced by a rotation of the rotor relative to the at least one yoke.

4. The electric generator according to claim 1, wherein each of the at least one yoke further comprises at least one bridge interconnecting diametrically opposed arms of the yoke.

5. The electric generator according to claim 4, wherein the at least one yoke comprises a first yoke and a second yoke, wherein the arms of the first yoke are angularly offset relative to the arms of the second yoke.

6. The electric generator according to claim 5, wherein the at least one coil is sandwiched between the bridges of the first and second yokes.

7. The electric generator according to claim 1, wherein the material of the wall is non-ferromagnetic.

8. The electric generator of claim 7, wherein the non-ferromagnetic material comprises at least one of austenitic stainless steel, aluminium, copper, brass, thermosetting plastic or thermoplastic.

9. The electric generator according to claim 1, further comprising a turbine wheel mechanically coupled to the rotor.

10. The electric generator according to claim 9, further comprising a shaft supporting the rotor and the turbine wheel, and bearings at each end of the shaft.

11. The electric generator according to claim 9, wherein the turbine wheel is located axially on the rotor and surrounds the rotor.

12. The electric generator according to claim 9, wherein the turbine wheel is an axial turbine wheel comprising blades extending radially and configured for converting an annular axial flow through the blades into a rotational movement of the turbine wheel and the rotor.

13. The electric generator according to claim 1, wherein the cavity houses a turbine wheel.

14. The electric generator according to claim 1, wherein at least one of the arms of the at least one magnetic yoke comprises at least one slit extending lengthwise.

15. A valve for gas cylinder, said valve comprising:
   a body with an inlet, an outlet and a passage interconnecting the inlet and outlet;
   a flow control device mounted on the body and controlling the flow of gas in the passage;
   an electric generator with a turbine wheel located in the passage, configured for outputting electric power when the gas flow in the passage rotates the turbine wheel;
   wherein the electric generator comprises:
      a rotor with permanent magnets, configured for rotating about a rotation axis;
      at least one magnetic yoke with at least two arms extending axially inside or outside of the rotor so as to be adjacent to the radial inner or outer side, respectively, of the rotor;
   wherein the permanent magnets are arranged according to an Halbach array so as to maximize the magnetic field on the radial side of the rotor adjacent to the arms of the at least one yoke; and
   wherein the generator comprises a wall forming a cavity housing the rotor, the arms of the at least one yoke being out of the cavity, the wall being formed by the material of the body.

16. A conduit with a wall delimiting a passage for a fluid and with an electric generator with a turbine wheel located in the passage so as to be driven when the fluid flows, wherein the electric generator comprises:
   a rotor with permanent magnets, configured for rotating about a rotation axis;
      at least one magnetic yoke with at least two arms extending axially inside or outside of the rotor so as to be adjacent to the radial inner or outer side, respectively, of the rotor;
   wherein the permanent magnets are arranged according to an Halbach array so as to maximize the magnetic field on the radial side of the rotor adjacent to the arms of the at least one yoke; and
   wherein the electric generator further comprises a wall forming a cavity housing the rotor, the arms of the at least one yoke being out of the cavity, the wall being formed by the material of the body.

17. An electric generator, said generator comprising:
   a rotor with permanent magnets, configured for rotating about a rotation axis;
   at least one magnetic yoke with at least two arms extending axially inside or outside of the rotor so as to be adjacent to the radial inner or outer side, respectively, of the rotor;
   wherein the permanent magnets are arranged according to a Halbach array so as to maximize the magnetic field on the radial side of the rotor adjacent to the arms of the at least one yoke; and
   wherein at least one of the at least two arms of the at least one magnetic yoke comprises at least one slit extending lengthwise.

* * * * *